(12) United States Patent
Harrison et al.

(10) Patent No.: US 10,328,424 B2
(45) Date of Patent: Jun. 25, 2019

(54) POROUS ACTIVATED ALUMINA BASED SORBENT FOR LITHIUM EXTRACTION

(71) Applicant: All American Lithium LLC, El Paso, TX (US)

(72) Inventors: Stephen Harrison, Benicia, CA (US); C. V. Krishnamohan Sharma, Milpitas, CA (US); M. Scott Conley, Cypress, TX (US)

(73) Assignee: All American Lithium LLC, El Paso, TX (US)

( * ) Notice: Subject to any disclaimer, the term of this patent is extended or adjusted under 35 U.S.C. 154(b) by 0 days.

(21) Appl. No.: 15/702,277

(22) Filed: Sep. 12, 2017

(65) Prior Publication Data

US 2018/0056283 A1    Mar. 1, 2018

Related U.S. Application Data

(60) Division of application No. 14/529,324, filed on Oct. 31, 2014, now Pat. No. 9,764,318, which is a continuation of application No. 13/283,311, filed on Oct. 27, 2011, now Pat. No. 8,901,032.

(60) Provisional application No. 61/408,452, filed on Oct. 29, 2010.

(51) Int. Cl.
| | | |
|---|---|---|
| *C01F 7/02* | (2006.01) | |
| *B01J 20/08* | (2006.01) | |
| *B01J 39/10* | (2006.01) | |
| *B01J 39/02* | (2006.01) | |
| *C22B 26/12* | (2006.01) | |
| *B01J 20/04* | (2006.01) | |
| *B01J 20/28* | (2006.01) | |

(52) U.S. Cl.
CPC ............ *B01J 39/10* (2013.01); *B01J 20/041* (2013.01); *B01J 20/08* (2013.01); *B01J 20/2803* (2013.01); *B01J 20/28026* (2013.01); *B01J 39/02* (2013.01); *C01F 7/021* (2013.01); *C22B 26/12* (2013.01); *C01P 2002/08* (2013.01); *C01P 2004/60* (2013.01); *Y10T 428/2982* (2015.01)

(58) Field of Classification Search
CPC ...................................................... B01L 39/10
See application file for complete search history.

(56) References Cited

U.S. PATENT DOCUMENTS

| | | |
|---|---|---|
| 4,159,311 A | 6/1979 | Lee et al. |
| 4,347,327 A | 8/1982 | Lee et al. |
| 4,348,295 A | 9/1982 | Burba, III et al. |
| 4,348,296 A | 9/1982 | Bauman et al. |

(Continued)

FOREIGN PATENT DOCUMENTS

| | | |
|---|---|---|
| JP | 51074992 | 6/1976 |
| WO | 2016073007 | 5/2016 |

OTHER PUBLICATIONS

"Non-Final Office Action" issued in U.S. Appl. No. 13/283,311, dated Feb. 11, 2014, 7 pages.

(Continued)

*Primary Examiner* — Melissa S Swain
(74) *Attorney, Agent, or Firm* — Kilpatrick Townsend & Stockton LLP

(57) ABSTRACT

This invention relates to a method for preparing a lithium activated alumina intercalate solid by contacting a three-dimensional activated alumina with a lithium salt under conditions sufficient to infuse lithium salts into activated alumina for the selective extraction and recovery of lithium from lithium containing solutions, including brines.

10 Claims, 6 Drawing Sheets

(56) References Cited

U.S. PATENT DOCUMENTS

| | | | |
|---|---|---|---|
| 4,430,311 | A | 2/1984 | Lee et al. |
| 4,461,714 | A | 7/1984 | Burba, III et al. |
| 4,727,167 | A | 2/1988 | Burba, III et al. |
| 5,389,349 | A | 2/1995 | Bauman et al. |
| 5,599,516 | A | 2/1997 | Bauman et al. |
| 5,885,917 | A | 3/1999 | Ohdan et al. |
| 8,901,032 | B1 | 12/2014 | Harrison et al. |
| 9,764,318 | B2 | 9/2017 | Harrison et al. |
| 2014/0239224 | A1 | 8/2014 | Burba et al. |

OTHER PUBLICATIONS

"Notice of Allowance" issued in U.S. Appl. No. 13/283,311, dated Aug. 1, 2014, 7 pages.
"Non-Final Office Action" issued in U.S. Appl. No. 14/529,324, dated Jul. 29, 2016, 6 pages.
"Non-Final Office Action" issued in U.S. Appl. No. 14/529,324, dated Oct. 19, 2015, 9 pages.
"Notice of Allowability" issued in U.S. Appl. No. 14/529,324, dated Jun. 9, 2017, 4 pages.
"Notice of Allowance" issued in U.S. Appl. No. 14/529,324, dated May 24, 2017, 7 pages.
"International Preliminary Report on Patentability", issued in PCT/US2014/064662, dated May 18, 2017, 6 pages.
"International Search Report and Written Opinion", issued in PCT/US2014/064662, dated Jun. 30, 2015, 7 pages.
"Non-Final Office Action" issued in U.S. Appl. No. 13/283,311, dated Aug. 1, 2014, 7 pages.
"First Office Action" issued in U.S. Appl. No. 14/529,324, dated Oct. 19, 2015, 9 pages.

POROUS ACTIVATED ALUMINA BASED SORBENT FOR LITHIUM EXTRACTION

RELATED APPLICATIONS

This application is a divisional of U.S. Ser. No. 14/529,324, filed Oct. 31, 2014, now U.S. Pat. No. 9,764,318, which is a continuation of U.S. Ser. No. 13/283,311, filed Oct. 27, 2011, now U.S. Pat. No. 8,901,032, which claims priority to U.S. Provisional Patent Application Ser. No. 61/408,452, which was filed on Oct. 29, 2010, the disclosure of all of which is are incorporated herein by reference in its entirety their entireties.

BACKGROUND OF THE INVENTION

Technical Field of the Invention

The invention generally relates to the field of selectively removing and recovering lithium from lithium containing solutions. More particularly, the invention relates to a composition, methods of preparing the composition, and methods of using the composition for the selective removal and recovery of lithium ions from a lithium ion containing solution, such as a brine, preferably without the removal of other ions from the solution.

Description of the Prior Art

Approximately 75 to 80% of lithium chloride, lithium carbonate, and derivatives thereof are produced from lithium that is recovered from brines, frequently via natural evaporative processes. The invention described herein is applicable to these and other such brine sources.

Geothermal brines are currently of particular interest for a variety of reasons. First, many geothermal brines can be used to provide a source of electrical power due to the fact that hot geothermal reservoirs are stored at high pressure underground, which when released to atmospheric pressure, can provide a flash-steam. The flash-stream can be used, for example, to run a power plant. In some geothermal waters and brines, associated binary processes can be used to heat a second fluid, which can provide steam for the generation of electricity without the flashing of the geothermal brine. Finally, many geothermal brines contain various useful and valuable elements dissolved therein, which can be recovered and utilized for secondary processes.

It is known that geothermal brines frequently include various metal ions dissolved therein, particularly alkali and alkaline earth metals, as well as certain transition metals such as manganese, lead, silver and zinc, in varying concentrations, depending upon the source of the brine. Recovery of these metals is potentially important to the chemical and pharmaceutical industries. Typically, the economic recovery of metals from natural brines, which may vary widely in composition, depends not only on the specific concentration of the desired metal within the brine, but also upon the concentrations of the various interfering ions, particularly silica, calcium and magnesium, because the presence of interfering ions can drastically increase recovery costs as additional steps must be taken to remove the interfering ions.

As lithium has gained importance as an element for use in various applications, such as for use in batteries and pharmaceutical compounds, research has focused on developing simple and inexpensive methods for the recovery thereof. For example, Burba previously developed two- and three-layer lithium aluminates for the recovery of lithium from brines. (See, for example, U.S. Pat. Nos. 4,348,295 and 4,461,714; each of which is incorporated herein by reference in their entirety). Certain prior art methods that employ packed columns for the recovery, however, suffer from many drawbacks, such as inefficient lithium extraction capacities and shortened lifetimes due to the slow deterioration and/or disintegration of the particles.

It is known that different forms aluminum hydroxide (which may be present in crystalline, polycrystalline, polymorphic, or amorphous forms) and their intercalated compounds such as $[LiX]_{0-1}[Al(OH)_3]_2$, (wherein X is an anion) (hereinafter "lithium aluminum intercalates", or "LAI") can be used to selectively recover lithium values from brines. In traditional two-dimensional layered structure aluminum hydroxides, the layered structure facilitates intercalation of anions between the layers, while the positively charged lithium cation can diffuse into the hexagonal cavities formed within the two dimensional layer structure that readily accommodate ions the size of lithium.

While compositions prepared from two-dimensional forms of aluminum hydroxide can be used to extract lithium values from brines and other lithium containing solutions, there currently exists the need for the development of improved methods and compositions for the selective recovery of lithium from lithium containing brines, particularly compositions that are easy to synthesize, have a high capacity for the extraction of lithium, and have good long term physical stability.

SUMMARY OF THE INVENTION

Methods for the selective removal of lithium from lithium containing solutions, such as brines, geothermal brines, salar (salt flat) brines, continental brines, including Smackover brines, oilfield brines, and high ionic strength solutions, are provided herein. Also provided are sorbent compositions and methods for preparing sorbent compositions for the recovery of lithium from the various lithium containing solutions described above.

In one aspect, a method for preparing a composition for the recovery of lithium from a lithium containing brine is provided. The method includes the steps of preparing a solid sorbent composition, which includes an activated alumina lithium intercalate, by contacting or reacting a lithium salt with a three-dimensionally structured porous activated alumina under conditions sufficient to infuse the activated alumina with the lithium salt, wherein the mole ratio of lithium to aluminum is up to about 0.5:1.

In certain embodiments, the lithium salt is lithium chloride. In other embodiments, the lithium salt is lithium hydroxide. In certain embodiments, the step of contacting the lithium salt with the three-dimensionally structured porous activated alumina is performed in the presence of a hydroxide, carbonate, bicarbonate, borate, acetate, phosphate, fluoride, chloride, bromide or iodide of an alkaline or alkaline earth metal, and combinations thereof. In certain embodiments, the lithium salt is selected from lithium hydroxide or lithium chloride, and the step of contacting the lithium salt with the three-dimensionally structured porous activated alumina is performed in the presence of a carboxylate, sulfonate, carbonate, bicarbonate, borate, acetate, phosphonate, or phosphate. In certain embodiments, the carboxylate, sulfonate, carbonate, bicarbonate, borate, acetate, phosphonate or phosphate is present as a buffer. In certain embodiments, the lithium salt is lithium hydroxide, and it is contacted with the three-dimensionally structured porous activated alumina in the presence of lithium chloride. In certain embodiments, the step of contacting the lithium salt with the three-dimensionally structured porous activated alumina is conducted at a pH of greater than about 10. In certain embodiments, the contacting step is conducted at a pH of between about 10 and 12, alternatively between about 11 and 12, alternatively between about 11.1 and 11.7.

In certain embodiments, the alkaline or alkaline earth hydroxide is selected from lithium hydroxide, calcium hydroxide, sodium hydroxide or potassium hydroxide. In other embodiments, the activated alumina is amorphous. Alternatively, the activated alumina is crystalline. In yet other embodiments, the activated alumina is partially crystalline. In certain embodiments, the activated alumina comprises more than one phase.

In another aspect, a composition for the recovery of lithium from a lithium containing solution is provided. The composition includes particulate sorbent material that includes an activated alumina lithium intercalate composition, wherein the activated alumina lithium intercalate composition is produced by infusing a three-dimensionally structured activated alumina with a lithium salt(s) to produce a $LiX/Al(OH)_3$ solid having a mole fraction of lithium to aluminum of up to about 0.5, wherein X is the anion of the lithium salt.

In certain embodiments, the lithium salt is lithium chloride. In other embodiments, the lithium salt is lithium hydroxide. In certain embodiments, the particulate material has an average diameter of between about 200 and 800 μm. Alternatively, the particulate material has an average diameter of between about 300 and 500 μm, alternatively between about 400 and 700 μm, alternatively between about 350 and 650 μm.

In another aspect, a method for the removal and recovery of lithium from a lithium containing solution is provided. The method includes the step of providing an extraction and recovery apparatus, such as a column, that includes a sorbent composition that includes an activated alumina lithium intercalate composition, wherein the composition is prepared by the steps of contacting a lithium salt with a three-dimensionally structured activated alumina and hydrochloric acid under conditions sufficient to infuse the activated alumina with the lithium salt(s), wherein the mole ratio of lithium to aluminum is up to about 0.5:1. The method further includes the step of washing the sorbent composition with at least one half bed volume of a wash solution comprising at least about 50 ppm lithium and supplying a lithium containing solution to the extraction and recovery apparatus and contacting the lithium containing solution with the sorbent composition, wherein the contacting step is sufficient to extract lithium chloride from the lithium containing solution. The method can also include the step of monitoring the output of the extraction and recovery apparatus to determine the saturation of the sorbent composition; and recovering extracted lithium chloride by washing the sorbent composition with the wash solution.

In certain embodiments, the lithium salt is lithium chloride. In alternate embodiments, the lithium salt is lithium hydroxide. In certain embodiments, the method further includes the step of contacting the lithium salt and activated alumina in the presence of a hydroxide selected from the group consisting of sodium hydroxide, potassium hydroxide, or calcium hydroxide.

DETAILED DESCRIPTION OF THE INVENTION

Figure 1:
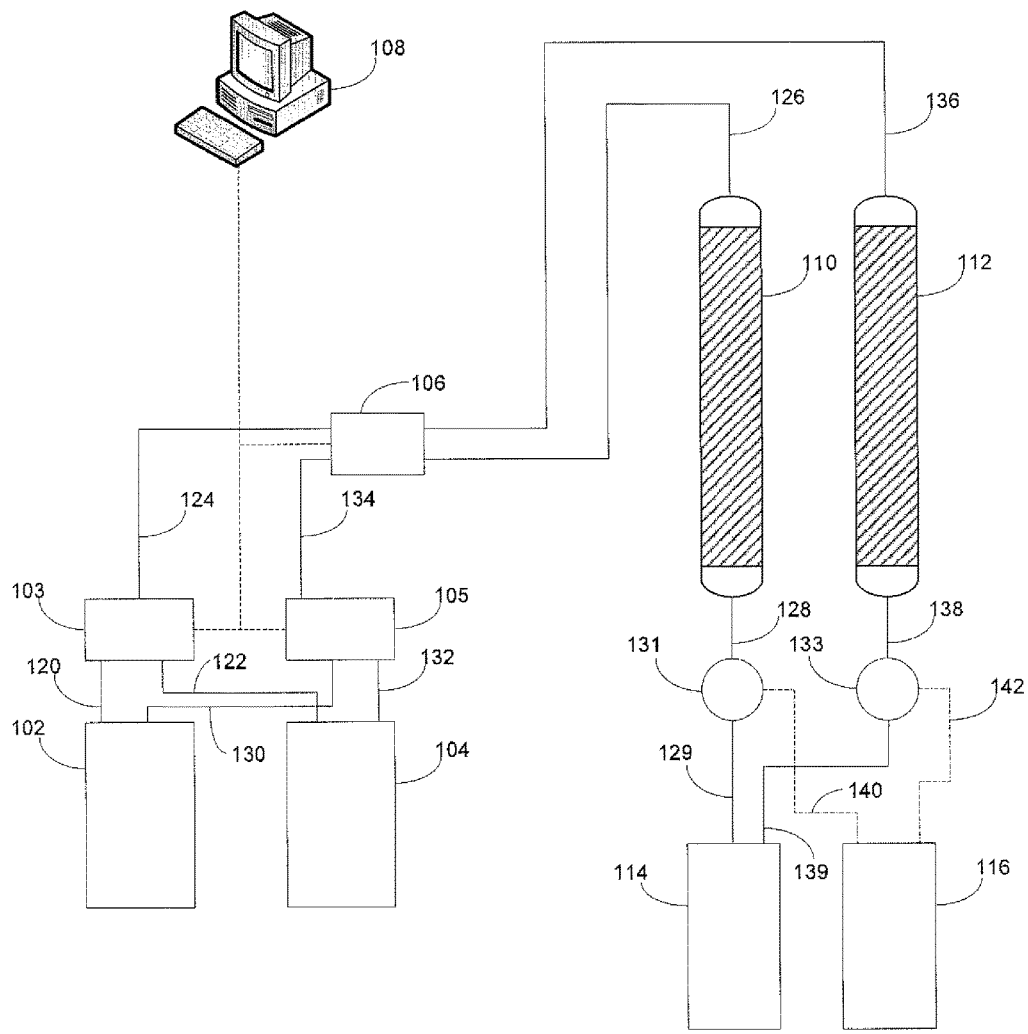
FIG. 1 is an illustration of an apparatus for use according to one embodiment of the present invention.

Broadly, in one aspect, methods are described herein for the preparation of novel compositions of highly lithiated intercalates of lithium salts, including lithium chloride, in three-dimensionally structured (porous) activated alumina, for the extraction of lithium salts, particularly lithium halides, from solutions and brines that include said lithium salts. As used herein, lithium salts can include lithium nitrates, lithium sulfates, lithium bicarbonate, lithium halides (particularly chlorides and bromides), and acid salts. In addition, in another aspect, novel methods for the selective extraction of lithium halides from solutions and brines that include said lithium halides are described herein.

Suitable forms of three-dimensionally structured porous activated alumina for use herein include, but are not limited to, $\alpha$-$Al_2O_3$, $\beta$-$Al_2O_3$, $\gamma$-$Al_2O_3$, $\theta$-$Al_2O_3$, $\chi$-$Al_2O_3$, $\kappa$-$Al_2O_3$, $\epsilon$-$Al_2O_3$, $\delta$-$Al_2O_3$, $AlO(OH)$, $Al_4O_3(OH)_6$ (pseudoboehmite), and the like, and combinations thereof. In certain embodiments, only activated alumina having a metastable or transition form of alumina, are utilized to prepare the highly lithiated intercalates.

The present invention, in certain embodiments, provides a sorbent composition that includes an intercalate material that includes lithium and a three-dimensionally structured (porous) activated aluminum material for use in the removal and recovery of lithium from solutions, particularly lithium salts from geothermal and other brines. The presently described activated alumina lithium intercalate sorbent composition advantageously provides a controllable and maximum allowable lithium to aluminum ratio, and a favorable structural form of particulate media, thereby providing increased capacity for removal and recovery of lithium. In certain embodiments, the activated alumina lithium intercalate sorbent composition has a mole fraction of lithium to aluminum in the range of about 0.1 to 0.3, and preferably up to about 0.33. The ratio of lithium to alumina is critical in stabilizing the structural form of the material and maximizing the number of lithium sites available in the matrix for the loading and unloading of lithium from a brine solution.

In certain embodiments, a three-dimensionally structured (porous) activated alumina is contacted or reacted with a lithium containing compound, such as a lithium salt, for example lithium hydroxide, and in certain other embodiments lithium chloride, to form composite activated aluminum lithium intercalate sorbent materials. It is understood, that certain reaction conditions may be necessary to promote reaction upon contacting the activated alumina and the lithium containing compound concentration, reactant molar ratios, such as for example temperature, lithium and pH. The ratio of activated alumina to lithium salt can be 1:1, alternatively about 1.3:1, alternatively about 1.4:1, or alternatively about 1.5:1. Furthermore, under certain conditions, the formation of the three-dimensional structure of the intercalate materials occurs controllably with respect to the growth of the materials, thereby resulting in materials having controlled sizes, shapes, and porosity, as compared with other lithium aluminum intercalate materials that are prepared using two-dimensional alumina or aluminum hydroxide. The fact that the rate of reaction between lithium salts and three-dimensional activated alumina can be regulated to control the crystal growth of the resulting sorbent media enables greater lithium extraction efficiencies and physical stability, as compared to lithium extraction media derived from two-dimensional alumina aluminum hydroxide related materials.

In certain embodiments, the step of contacting the activated alumina with the lithium hydroxide is done in the presence of a metal halide, particularly an alkali or alkaline earth metal halide, such as sodium chloride or lithium chloride. In certain embodiments, the metal halide, for example lithium chloride, may not actually react with either the activated alumina or the lithium salt, but the presence is believed to assist in the preservation of the structural integrity of the resulting compound. It is believed that the metal halide, for example lithium chloride, may act as a surfactant and may assist in preventing agglomeration of the resulting product. Generally, when the metal chloride is lithium chloride, it can be present in an amount of 1 to 30% by weight. In general, the mole ratio between the LAI, the metal halide, and the weak acid is about 1:1:1. In certain embodiments, the mole ratio of LAI to metal halide is between about 1:1 and 1:10, alternatively between about 1:1 and 1:5, alternatively between about 1:1 and 1:1.5, alternatively between about 1:1.1 and 1:1.4, alternatively between about 1:1.1 and 1:1.3. The mole ratio of LAI to weak acid is between about 1:1 and 1:10, alternatively between about 1:2 and 1:5, provided that the mole ratio of LAI to metal halide is at least about 1:1.1. In certain embodiments, lithium chloride can be present in an amount of between about 1 and 30% by weight (based upon the amount of lithium salt, such as lithium hydroxide) that has been added, alternatively between about 5 and 25% by weight, alternatively between about 5 and 15% by weight, alternatively between about 15 and 25% by weight.

In certain embodiments, the step of contacting the activated alumina with the lithium salt, for example lithium chloride, is done at a pH of greater than about 7, preferably greater than about 10. In certain embodiments, the pH is between about 7 and 10, alternatively between about 9 and 12, alternatively between about 9 and 11, alternatively between about 10 and 12, or alternatively between about 11 and 13. Alternatively, the pH is between about 7 and 11, or between about 10 and 13. In certain embodiments, the pH during the contacting step is between about 11 and 12, alternatively between about 11.25 and 11.75, alternatively between about 11 and 11.5, alternatively between about 11.5 and 12.

In certain embodiments, depending on the structure or form of the activated aluminum oxide that is commercially available, the activated aluminum oxide may react with the lithium salt, for example lithium chloride and lithium hydroxide, at different rates to form the new composite materials. Activated alumina materials can include amorphous, metastable, crystalline, partially crystalline, and polycrystalline forms. In certain embodiments, the activated alumina material can include more than one phase. In certain embodiments, certain polymorphic forms of activated alumina may not react with lithium hydroxide to a significant extent, particularly alumina forms that have been heated to temperatures greater than 1000° C., or greater than about 1500° C. In certain other embodiments, certain stable polymorphic forms of alumina (e.g., corundum), may be less reactive with respect to lithium hydroxide, as compared with other polymorphic forms (e.g., γ alumina). Similarly, in certain embodiments, non-activated aluminum oxides may react slowly with lithium hydroxide (sometimes to the extent that it is difficult or impractical to infuse lithium salts into such materials), as compared to activated/meta stable aluminum oxides, which can lead to improved cohesive binding crystal growth of LAI platelets and thereby improve lithium extraction efficiency. In certain embodiments, in part due to the variances in reactivity of the different structures and forms of commercially available activated alumina, the products thereof may exhibit differences in their ability to extract lithium from lithium containing solutions.

In certain embodiments, the activated alumina can have a melting point of greater than about 2000° C., preferably greater than about 2025° C., even more preferably greater than about 2045° C. In certain embodiments, the pH of the activated alumina can be between about 4 and 10, preferably about 7.0±0.5, alternatively between about 7.2±0.5. Pore volume of the activated alumina can be about 90Å, alternatively between about 75Å and about 110Å. Bulk density of the activated alumina can be greater than about 800 kg/m$^3$, alternatively about 850 kg/m$^3$. The surface area of the activated alumina can be between about 100-600 m$^2$/g, alternatively between about 150-350 m$^2$/g, alternatively between about 230-300 m$^2$/g.

The resulting LAI product can be a particulate material having an average diameter of greater than about 75 μm. Alternatively, the product can be a particulate material having an average diameter of less than about 700 μm. In certain embodiments, the resulting particulate material has an average diameter of between about 75 and 700 μm, alternatively between about 200 and 400 μm, alternatively between about 300 and 800 μm.

As used herein, brine solution can refer to a naturally occurring or synthetically prepared aqueous solution of alkali and/or alkaline earth metal salt(s), wherein the concentration of salts can vary from trace amounts up to the point of saturation. Generally, brines suitable for the methods described herein are aqueous solutions that may include alkali metal or alkaline earth chlorides, bromides, sulfates, borates, acetates, hydroxides, nitrates, and the like, including natural brines. Exemplary elements that may be present in the geothermal brines can include sodium, potassium, calcium, magnesium, lithium, strontium, barium, iron, boron, silicon, manganese, zinc, aluminum, antimony, chromium, cobalt, copper, lead, arsenic, mercury, molybdenum, nickel, silver, gold, thallium, radon, cesium, rubidium, vanadium, sulfur, chlorine, and fluorine, although it is understood that other elements and compounds may also be present. Brines can be obtained from natural sources, such as, Chilean brines, Argentinean brines, Bolivian brines, Salton Sea brines, geothermal brines, and sea water, or can be obtained from other sources, such as oilfield brines (e.g., Smackover brines), mineral brines (e.g., lithium chloride or potassium chloride containing brines), alkali metal salt brines, and industrial brines, for example, industrial brines recovered from ore leaching, mineral dressing, and the like. The methods described herein equally applicable to artificially prepared brine or salt solutions, as well as waste water streams, provided that the salinity of the solution is sufficiently high (for example, having a minimum concentration of at least about 1% by weight common salt), or the concentration of lithium salt is greater than about 50 ppm, preferably at least about 100 ppm. It is understood that, in certain embodiments, the exact concentration of salt sufficient to drive to sorption of lithium into the lithium aluminate is dependent on the exact dissolved metal species and their concentrations present in the solution.

In certain embodiments, the present invention can be used in conjunction with additional methods, including steps designed to first removing silica from the brine. For example, in certain embodiments, the present brines contemplated for use herein can first be treated by known means, generally known as silica management, to first remove silica and/or iron, prior to the recovery of any lithium. In certain embodiments, the brine or lithium containing solution can also be filtered or treated to remove solids or other elements that may be present in the solution, prior to the selective recovery of lithium.

As used herein, simulated brine refers to a synthetic brine that has been prepared in an attempt to simulate the brine composition of various geothermal brine test wells found in the Salton Sea (Calif., U.S.). Generally, the simulated brine has a composition of about 280 ppm lithium, 63,000 ppm sodium, 20,000 ppm potassium, 33,000 ppm calcium, 130 ppm strontium, 700 ppm zinc, 1700 ppm iron, 450 ppm boron, 50 ppm sulfate, 3 ppm fluoride, 450 ppm ammonium ion, 180 ppm barium, 160 ppm silica (reported as $SiO_2$), and 180,000 ppm chloride. Additional elements, such as manganese, aluminum, antimony, bromine, chromium, cobalt, copper, fluorine, lead, arsenic, mercury, molybdenum, nickel, silver, thallium, and vanadium, may also be present in the brine.

In certain other embodiments, matrices based upon activated alumina lithium intercalate sorbent compositions can be prepared by mixing the sorbent material with a polymer, plastic, or other organic or inorganic binder material. In certain embodiments, the matrix preferably includes a polymeric material or binder that can be cross-linked. Typically, the resulting matrix can include a major portion of an activated alumina lithium intercalate, prepared according to the methods described herein, and a minor portion that includes polymeric, plastic, or other binder material, which can serve as the matrix binder. In certain embodiments, the matrix includes between about 75% and 99% by weight of the activated alumina lithium intercalate material, and between about 1% and about 25% by weight of the polymer, plastic or binder material. Alternatively, the matrix can include between about 60 and 80% by weight activated alumina and between about 20 and 40% by weight polymer, plastic or binder, alternatively between about 70 and 90% by weight activated alumina and between about 10 and 30% by weight polymer, plastic or binder.

In certain embodiments, the polymer or plastic binder material employed in the preparation of the matrix materials can be selected from any suitable thermoplastic or thermoset polymer material. Some of the inorganic binder may include, aluminates, silicates, silanes, metal alkoxides, metal hydroxides, titanates, zirconates, phosphate, poly aluminum hydroxyl chlorides, and several other forms of inorganic binders, as well as combinations thereof.

In certain embodiments, the polymer/plastic material and the sorbent composition can be mixed together and sintered at elevated temperature to form the sorbent composition. In certain embodiments, pressure can be applied to the mixture before, during, or after the sintering process. In certain embodiments, up to 10,000 psi can be applied to the mixture, with or without concurrent heating thereof. In certain embodiments, pressure of at least 2500 psi is applied. In alternate embodiments, increasingly greater pressures are applied to the mixture. The resulting sintered product is typically a solid, which can then be broken into smaller pieces, preferably to form a plurality of particulates, for use in the extraction of lithium. Optionally, the solid sintered products can be ground to a desired particulate diameter or size. In certain embodiments, the ground sorbent matrix can be separated, using for example sieves, to provide multiple sizes or ranges of diameters of the sorbent matrix particles.

In certain embodiments, the sorbent-polymer matrix can be pressed in a mold on any desired shape or size. In certain embodiments, the sorbent-polymer matrix can be cured and formed as a sheet or like shape, suitable for use as, for example, a cartridge filter wherein a lithium containing solution is passed over and/or through the sheet for the extraction of the lithium containing ions. In certain embodiments, lithium infused activated alumina particles can be treated with binder solutions/cross-linkers to further enhance the rigidity of the already existing structures.

In other embodiments, methods for the removal and recovery of lithium using materials prepared from activated alumina are provided. Generally, during use, the activated alumina lithium intercalate sorbent materials prepared according to the above described methods can be washed with a predetermined amount of water to remove a portion of the LiCl from the solids, thereby creating vacant sites that are available to receive lithium halides or other lithium salts from a brine or solution. For example, upon exposure to a solution or brine that includes lithium chloride, the sorbent material can then accept lithium chloride ions. The initial wash water preferably includes at least a small concentration of LiCl. In certain embodiments, the wash water includes at least 100 ppm LiCl. In alternate embodiments, the wash water includes at least 150 ppm LiCl. In yet other embodiments, the wash water includes at least 200 ppm LiCl. In certain embodiments, the wash water may include a salt, such as NaCl, KCl, or any other salt or non-ionic solute that may be advantageous for a particular lithium salt extraction process. Typically, chlorides are selected due to their relatively low cost, however it is understood that other halides can also be used. In certain embodiments, divalent and trivalent salts are avoided.

After the vacant sites in the sorbent material have been exposed by rinsing with the wash water, the vacant sites can then be loaded with "new" LiCl or other salts by exposing the sorbent material to the brine or solution that includes LiCl or other lithium salts. In certain embodiments, the brine or solution does not include salts that will compete with the extraction of lithium. As the LiCl in the brine or solution contact a vacant site, the lithium ions are captured by the sorbent material and fill the exposed vacancies. After the sorbent material is saturated with lithium salt, for example LiCl, the flow of the brine can be stopped. The captured LiCl can then be unloaded from the sorbent material by again washing the sorbent material with wash water, as described herein. In certain embodiments, as noted with respect to the initial wash water above, the wash water includes a small amount of LiCl present, such as at least 100 ppm of lithium, sufficient to ensure that at least a portion of the capture sites on the LAI matrix are filled with ions to prevent the sorbent material from collapsing. The process can be repeated many times, as desired The loading and unloading of the sorbent material can be monitored by measuring the lithium concentration of the outlet of the column. Means for monitoring the concentration of the lithium can include ion selective electrodes, ion chromatography, or spectrometric analysis, such as atomic absorption or inductively coupled plasma spectroscopy, and other means known in the art. The loading process is typically fairly efficient, such that at least 50% of the lithium ions in the brine or solution are captured by the sorbent material, preferably at least 75% of the lithium ions in the brine or solution are captured by the sorbent material. As such, a rapid increase in the lithium ion concentration at the outlet of the sorbent material is indicative of saturation of the column. Similarly, when recovering the lithium ions from the sorbent material, as the process is proceeding and ions are being removed, a sudden decrease in the concentration thereof can be indicative of the removal of a majority of the ions captured by the material.

In certain embodiments, the sorbent material prepared according to the present methods has an extraction capacity suitable for use in brines having a lithium concentration similar to that of the Hudson Ranch geothermal brines, i.e., a lithium concentration of about 300 ppm, of at least about 1 mg of lithium per gram of the sorbent material, preferably at least about 2 mg of lithium per gram of the sorbent material, even more preferably at least about 3 mg of lithium per gram of the sorbent material. The extraction capacities may be larger for brines containing higher concentrations of lithium.

In another aspect, an alternate sorbent material and method for preparing same are provided. In certain embodiment, the hydroxyl form of the LAI material prepared as previously described can be neutralized with inorganic acids, such as hydrochloric acid or nitric acid. Alternatively, the hydroxyl form of the LAI material prepared as previously described can be neutralized with a weak acid or buffer, such as carboxylic acids, for example acetic acid, boric acid, phosphonic acid, phosphoric acid, sulfonic acid, carbonic acid and bicarbonic acid, in presence of a metal halide, such as concentrated lithium chloride solution. As used herein, buffer is used to refer to a composition that is capable of maintaining the pH of a solution within a certain defined range. For example, in certain embodiments, the neutralization of the intercalate material is preferably conducted such that at equilibrium, the pH is not less than about 2.5, alternatively between about 4 and 6, alternatively between about 3 and 5, alternatively between about 4 and 5. Certain buffers can include weak acids, such as acetic acid. Exemplary LAI acidification buffers can include carboxylates (particularly acetates), sulfonates, phosphates, phosphonates, acetates, borates, carbonates, bicarbonates, and the like.

In general, it is preferred that the neutralization is performed at temperatures of less than about 60° C., alternatively at or below about 40° C., alternatively about room temperature. The neutralization step generally includes removing the liquid from the reaction of the activated alumina and lithium salt, adding an aqueous solution that includes the weak acid buffer or dilute strong acid and metal halide, optionally agitating the solution, and monitoring the pH change. Generally, the pH is initially high, such as greater than about 10, or in certain embodiments, greater than about 11. Gradually, upon contacting the LAI composition, the pH decreases to less than about 7, alternatively less than about 6, alternatively less than about 5, or alternatively less than about 4. After the pH has stabilized, which can be over a period of several hours, the solution added for neutralization is removed, the product is washed with water, and dried. This neutralization step can lead to the formation of a high performance chloride form of LAI material having lithium loading capacities of between about 4.0-5.0 mg/L, lithium concentrations in the product cut, 3.5-5 wt % and divalent metal impurity of around 1% of lithium carbonate equivalent in the product cut. The product has been shown to be particularly amenable to scale-up.

Without wishing to be being bound by any particular theory, it is believed that neutralization of the LAI material with a combination of a lithium chloride solution and weak acid buffer, such as acetic acid, helps to prevents the formation of unwanted high molecular weight (or polymeric) aluminum hydroxy chlorides, which, once formed formed, may attract divalent metal cations as impurities during usage in the lithium extraction process. In certain embodiments, the weak acid buffer solution utilized for the neutralization of the LAI material can include up to about 30% by weight lithium chloride, alternatively between about 2 and 7% by weight lithium chloride, alternatively between about 5 and 12% by weight, alternatively between about 10 and 15% by weight lithium chloride.

Neutralization of LAI with Organic Acids. In certain embodiments, the LAI can be neutralized with a weak acid buffer, such as acetic acid, in presence of concentrated lithium chloride containing solution. In certain embodiments, the molar ratio between the LAI material and the acetic acid can range between about 1:0.75 and about 1:10. In certain embodiments, a relatively low concentration of lithium chloride, for example up to about 10% by weight, alternatively up to about 5% by weight, alternatively between about 5 and 10% by weight, is required. An excess amount of lithium chloride from the concentrated lithium chloride containing solution may preclude potential intercalation of acetate anions and promote ion exchange between hydroxyl and chloride groups. Further, neutralization with a weak acid buffer, such as acetic acid, may prevent the formation of high molecular weight aluminum hydroxide byproducts that can attract impurities during lithium extraction process. In certain embodiments, a 30% aqueous lithium chloride solution was utilized. It was found that the amount of the weak acid buffer, for example acetic acid, used to neutralize the LAI, could be between about 1:0.5 and 1:1.25 molar equivalents, although in certain embodiments the presence of excess weak acid buffer (for example, 5-10 times the required amount) does not result in negative effects, provided the weak acid buffer solution, for example acetic acid, is buffered with a metal chloride solution, such as lithium chloride solution. Acetic acid utilized for the neutralization of the sorbent proceeds normally without dissolving significant quantities of the sorbent material. Performance of the resulting material for the extraction of lithium was not affected.

In certain embodiments, the sorbent material can be prepared using solution that includes an acetic acid buffer and lithium chloride for the neutralization thereof. In certain embodiments, the neutralization can be carried out in a column. In certain embodiments, various organic acids can be utilized for the neutralization of the LAI with in presence of metal halides to generate different organic salt byproducts. For example, lithium acetate, sodium acetate, and calcium acetate can be generated as byproducts using acetic acid and lithium chloride, sodium chloride, and calcium chloride as the metal salts, respectively. Similarly, in certain embodiments, it may be possible to use other organic acids (e.g., methyl sulfonic acid, propionic acid) to similarly produce the corresponding organic metal salts.

In certain embodiments, the neutralization of LAI with a weak acid buffer and metal halide, such as acetic acid and a concentrated lithium chloride containing solution, offers several advantages over certain other methods for the preparation of the sorbent for material. For example, the product resulting from the acetic acid neutralization demonstrates higher lithium loading capacities (e.g., capacities that are greater than about 4.2 mg/L); reduced impurities in the product cut (<1% LCE); consistent and reliable exchange of hydroxyl groups with chlorides; reduction of unwanted byproducts; the ability to conduct the neutralization on a large scale in a column; the formation of potentially valuable organic-metal salts byproducts (e.g., lithium acetate); and the avoidance of the use of corrosive acids for sorbent synthesis.

Referring now to FIG. 1, an exemplary laboratory apparatus for the capture and recovery of lithium ions from a solution or brine is provided. Apparatus 100 includes first vessel 102 for holding a wash (strip) solution and second vessel 104 for the brine or lithium containing solution. Solenoid valves 103 and 105 are connected to computer 108 and control the input of fluid, i.e., brine or wash solution. Apparatus 100 can further include digital peristaltic pump 106 (DPP). Computer 108 can be coupled to various instruments, such as DPP 106, and solenoid valves 103 and 105, is a component of apparatus 100, and can be programmed to control the action of the DPP and solenoid valves. Apparatus 100 further includes first sorbent material column 110 and second sorbent material column 112. Wash liquids and excess brine are collected in bulk collection vessel 114, and lithium ion produced can be recovered in sequential aliquots in product collection fractionator 116. As is understood, apparatus 100 may also include various heat exchangers, valves, and filters, for the control of the process.

Apparatus 100 includes two columns, 110 and 112 respectively, which are preferably packed with the sorbent material, typically as particulate matter, according to the present invention. It is understood that the apparatus can include a single column, or can include multiple columns. Glass wool, filters, or the like can be used at the top and bottom of the column to ensure that the sorbent material, or fines thereof, are not washed out of the column. In operation, columns 110 and 112 are operated in parallel, although in certain embodiments the columns can be alternated such that while one column is being loaded, the second column is being unloaded or equally in series. Systems are also contemplated that operate in a merry-go-round system having at least 3 columns, wherein two of the columns are in series and one column is being regenerated. After the first column in series is fully loaded, the first column switches to being regenerated. The second column then becomes the first column in series, and the column that was originally being regenerated becomes the second column in series, thus ensuring complete and efficient use of all the lithium capacity of the sorbent.

For example, during the loading of first column 110, brine from vessel 104 is supplied via line 122 to solenoid valve 103, and can then be supplied via line 124 to DPP 106. The brine is then supplied from DPP 106 via line 126 to first column 110, where the brine contacts the sorbent material, which is operable to remove lithium ions from said brine. Excess brine solution, and brine solution that has had lithium ions removed therefrom is recovered in collection vessel 114 via line 128.

Simultaneously, second column 112, which can be saturated with lithium ions, can be unloaded. Wash solution from vessel 102 can be supplied via line 130 to solenoid valve 105, and then supplied to DPP 106 via line 134. Wash solution is then supplied via line 136 to second column 112, where it contacts the sorbent material and removes lithium ions saturated thereon. A wash solution that is rich in lithium, as compared with the wash solution contained in vessel 102, is recovered in product collection fractionator 116, via line 142. Valves 131 and 133 control the flow of the output from first column 110 and second column 112 to collection vessel 114 and product collection fractionator 116, respectively.

As can be seen in FIG. 1, the operations of first and second columns 110 and 112 can be reversed and the first column can then be supplied with wash water for recovery of lithium ions and the second column can then be supplied with a brine solution for the removal of lithium therefrom.

Figure 2:
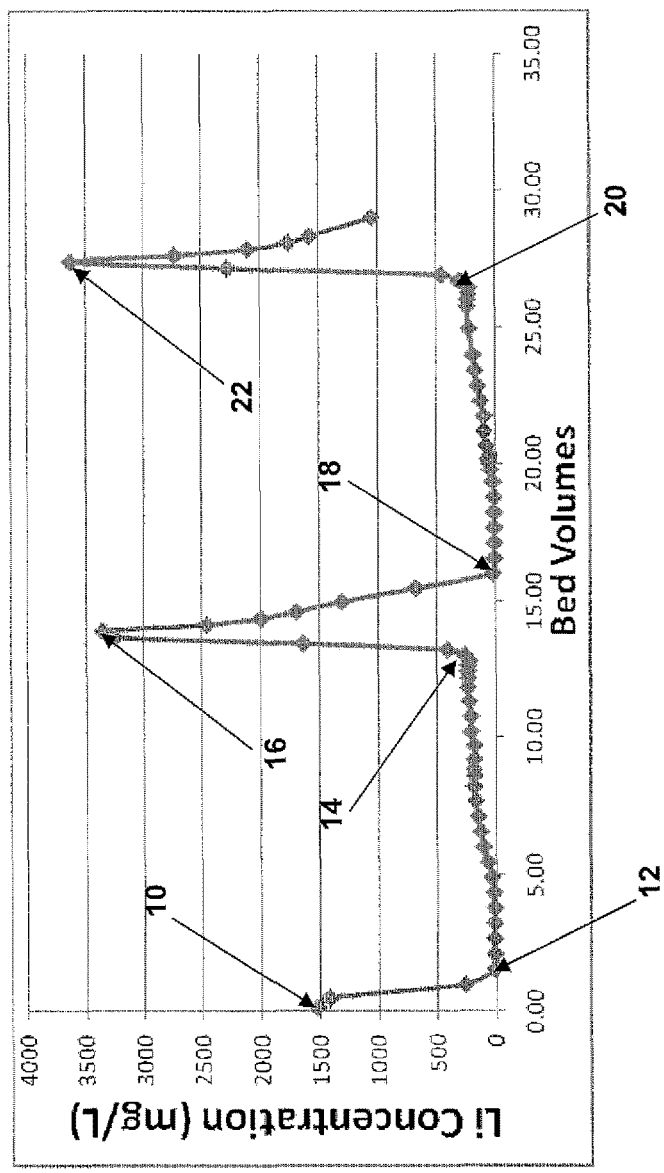
FIG. 2 is a graphical representation showing the loading and unloading of a column that includes a sorbent prepared according to one embodiment of the present invention.

Referring now to FIG. 2, the exemplary performance of a column which includes sorbent material (prepared according to Example 3, below), as shown by the lithium concentration of the liquid exiting the column during the loading and unloading thereof is provided. The column is loaded with approximately 10.8 mL of a granular sorbent having an average particle diameter of between about 0.3 and 0.8 mm consisting of lithium chloride infused activated alumina.

During the loading step, approximately 13 bed volumes (i.e., approximately 140 mL, thirteen times the volume of the column) of a simulated brine having a lithium concentration of between about 284 mg/L and about 310 mg/L were supplied to the column. The output stream from the column during loading had a lithium concentration of between about 10 and 50 mg/L, in the first 4 to 5 bed volumes, corresponding to the capture of between about 83% and 96% of the lithium present in the feed solution.

Unloading of the column is achieved by supplying approximately 2 bed volumes (i.e., approximately 20 mL) of a lithium strip solution (i.e., a solution having a LiCl concentration of approximately 6,000 mg/L). The output stream had a maximum LiCl concentration of about 21,000. The loading and unloading of the column was repeated more than 20 times, with repeatable results of the capture of between approximately 95% of the LiCl present in the brine solution.

Referring now to FIG. 2, the loading and unloading of the sorbent in the column is shown. (FIG. 2 shows cycles 5 and 6 of a total of 21 consecutive cycles of loading and unloading the column). The Figure shows two full loading-unloading cycles of the column, with lithium concentration of the liquid exiting the column in mg/L plotted on the Y-axis and bed volumes of liquid supplied to the column on the X-axis. Point 10 of FIG. 2 indicates the midpoint of an unloading cycle for the column. From point 10 to point 12 of FIG. 2, the brine (loading solution) is supplied to the column and is replacing the strip solution (unloading solution). Between points 12 and 14 of FIG. 2, the brine containing lithium is exiting the column. Between points 12 and 14 the concentration of lithium in the liquid exiting the column is relatively low, typically much less than the concentration of the strip solution. After point 14 of FIG. 2, the concentration of lithium exiting the column increases. At point 14 of FIG. 2, the solution being fed to the column is switched from the lithium containing brine solution to stripping solution (having a lithium concentration of about 1000 mg/L) and a total of 2 BV is passed through the column. In general, the amount of lithium that is unloaded or stripped from the column is close to the amount of lithium that is extracted from brines, such that lithium extraction efficiency is maximized/optimized, without compromising the structural integrity of the media. At point 18 of FIG. 2, the strip solution is switched back to the lithium containing brine loading solution and 20 through 22 to the end of the plot represent another complete cycle.

Still referring to FIG. 2, at point 12, a lithium recovery cycle has been completed and the column is empty or only has negligible lithium content, and loading of the lithium begins. At approximately point 14, supply of the lithium containing brine solution to the column stops. At point 14, loading of the column with lithium has been completed, and removal of the captured lithium begins. At point 16 of FIG. 2, after approximately 1 bed volume of the "release" solution has been applied, the concentration of the lithium being removed from the column increases. At point 18, the concentration of the lithium salt in the "release" solution begins to decrease. At point 20 of FIG. 2, the column has been completely unloaded, and the loading cycle of the column begins again. After point 20, the column is again exposed to the brine solution for the capture of lithium ions. As the column is exposed to increasing volumes of the brine solution, the lithium is loaded onto the column. After complete loading of the column, at a point that is approximately 1 bed volume of liquid before point 22 on FIG. 2, exposure to the brine solution is stopped and the "release" solution is applied to the column. At point 22, the lithium that had been retained on the column is released, as shown by the increased lithium production from the column. Thus, two "loading" and "unloading" cycles of the column have been shown.

In certain embodiments, the sorbent material is capable of being cycled at least 1500 cycles without a noticeable decrease in the performance of the matrix, preferably at least about 6000 cycles without a noticeable decrease in the performance of the sorbent material.

In addition to demonstrating repeated loading and unloading of the sorbent material, with consistent extraction and recovery of lithium, the pressure drop across the sorbent material column was also studied. As is understood in the art, in certain embodiments, it can be advantageous to operate the extraction columns with as low a pressure drop as is possible. It has been demonstrated that a column that includes an extraction material that includes the sorbent material displayed a pressure drop of less than about 15 psi/m of column bed over 550 loading and unloading cycles.

EXAMPLES

Example 1

In one embodiment, the lithium aluminate can be prepared as follows. To an appropriately sized metal or plastic container capable of being heated to a temperature of about 100° C. is added and mixed approximately 1 kg of unfractionated Alcoa aluminum trihydrate ($Al(OH)_3$) and $LiOH.H_2O$, in a ratio of approximately 2 moles of aluminum to approximately 1.05 moles of lithium, and about 0.8 kg of deionized water. The ratio of activated alumina to lithium hydroxide can generally vary between about 1:1 and 1.5:1. The mixture is heated in an oven at a temperature of about 60° C. until the hydroxide concentration, as determined by titration, indicates that at least about 93% of the hydroxide present has reacted. The mixture is removed from heat, cooled to room temperature and approximately 0.8 kg of water is added to the mixture. The resulting mixture is then neutralized using hydrochloric acid over a period of at least 2 hours to achieve a pH of between about 6.5 and 7.5. The resulting solid is filtered and dried.

Example 2

Preparation of Particulate PVDF/LAI Matrix. Approximately 1.47 g of polyvinylidene fluoride copolymer (Kynarflex 2821) and approximately 27.56 g of the LAI powder (as prepared in Example 2, above) were placed in a plastic jar and mixed using a mechanical stirrer, at increasingly higher speeds, 1000-5000 rpm, over a period of about five minutes. The resulting mixed matrix powder was placed in a frame having two Teflon lined metal plates. The powder mixture in the press frame was placed in a hydraulic press and subjected to approximately 3500 psi pressure for approximately three minutes, released, subjected to approximately 4000 psi of pressure for approximately, released, subjected to approximately 5000 psi of pressure and a temperature of about 360° C. for approximately 3 minutes, released, subjected to approximately 10,000 psi of pressure and a temperature of about 360° C. for approximately 3 minutes, and released. The assembly was then subjected to approximately 3500 psi of pressure for about 2-3 minutes. The resulting sintered block was then broken into large granulates using a hammer. The resulting granulates were separated using sieves into three groups consisting of a first group having a diameter of between about 300 and 450 μm, a second fraction having a diameter between about 180 and 300 μm, and a third fraction having a diameter of between about 100 and 180 μm.

Example 3

Figure 3:
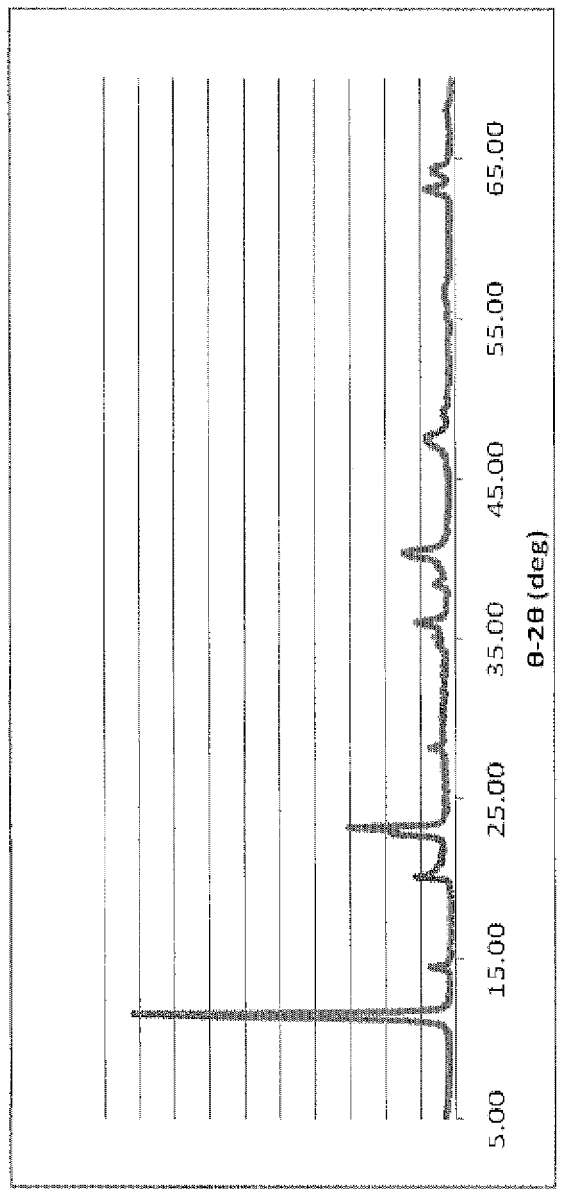
FIG. 3 is an X-ray powder diffraction pattern of one embodiment of the present invention.

Approximately 10.0 g of activated alumina (Dynamic Adsorbents, USA), having a particle size of less than about 400 microns was reacted with 45 mL of a solution of 10% lithium hydroxide monohydrate at a temperature of about 85-90° C. for approximately 3 hours. The mixture was stirred occasionally during the reaction to promote uniform crystal growth of the expanding aluminum oxide particles. After the reaction was complete, while the volume of the media was found to be increased, the particles retained structural integrity. The final product was thoroughly washed with water and titrated with 2N HCl until the pH of the solution was close to neutral. The final yield of the product was about 17.8 g. X-ray powder diffraction of the final product is shown in FIG. 3.

Example 4

Activated alumina derived sorbent composite particles prepared according to the method described in Example 3, having a diameter of between about 300-800 microns, was tested for extraction of lithium ions from a synthetic geothermal brine (wherein the brine is designed to simulate the geothermal fluids found at the Salton Sea, Calif., having lithium concentration of about 300 mg/L) using a column with 1 cm internal diameter. The preliminary loading/unloading was conducted at high temperatures 95° C., which indicates that the loading capacity of the sorbent composite exceeds about 3-3.7 g/L. This compares favorably to the materials prepared with two-dimensional alumina, which has a loading capacity of about 1.3 g/L, under the given experimental conditions. Thus, sorbent materials generally have capacities at least 50% greater, preferably about 66% greater, or even at least 100% greater than similar materials prepared using two-dimensional alumina materials.

Example 5

Approximately 10 g of activated alumina (Dynamic adsorbents, GA), having a particle size of less than about 400 microns, was initially heated up to 700° C. for a period of about 3 hours to ensure that the material is fully dehydrated and has phase purity prior to adding 50 mL of 10% lithium hydroxide monohydrate solution. The reaction was carried at 80-90° C. for 30-40 hours. It is believed that the extended heating of the aluminum oxide (prior to reacting with lithium hydroxide) may prolong the reaction time, and may alter crystal growth properties. The final product had a mass of about 21 g.

Example 6

Figure 4:
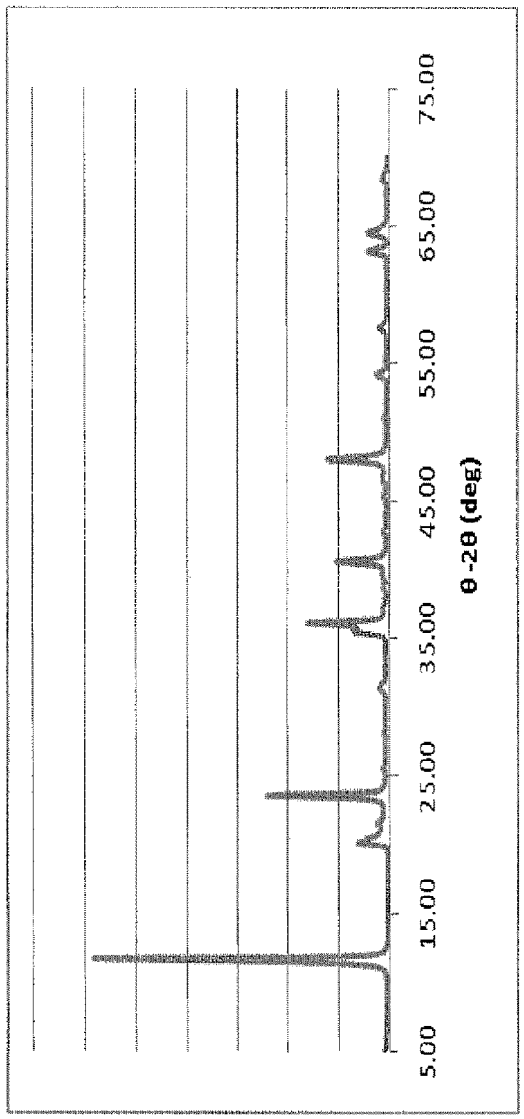
FIG. 4 is an X-ray powder diffraction pattern of one embodiment of the present invention.

Approximately 100 g of 8-14 mesh activated alumina granules (Fisher Scientific, USA) was reacted with 450 mL of a 10% solution of lithium hydroxide monohydrate at about 90° C. for about 3 hours. The volume of the granules enhanced significantly following the reaction and the final weight of the product was around 200 g. The x-ray powder diffraction spectrum of the product is shown in FIG. 4.

Example 7

Figure 5:
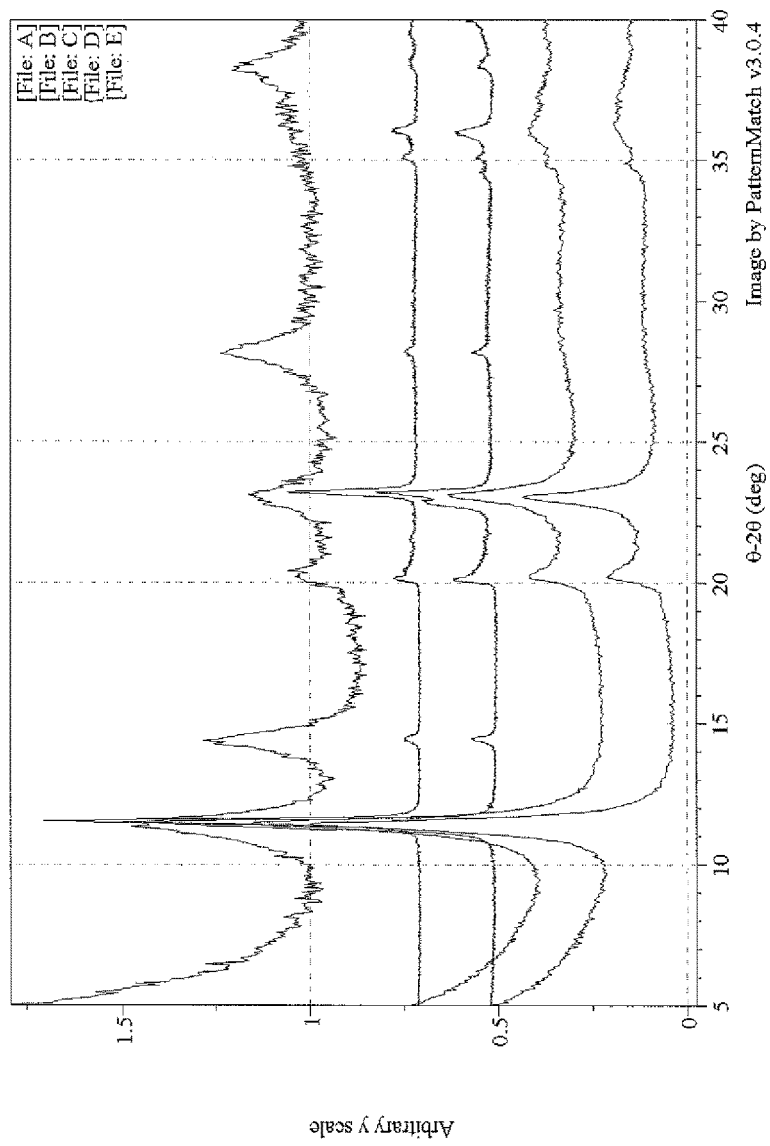
FIG. 5 is a comparison of the X-ray powder diffraction patterns of several embodiments of the present invention.

Approximately 20 g of 8-14 mesh activated alumina (Fisher Scientific, USA) was added to 50 mL of a 40% by weight solution of lithium chloride, and was heated at about 90° C. for about 12 hours. The final product was washed and dried to produce 32 g of product, having a bulk density of about 1.16 g/cc. The x-ray powder diffraction, shown as a stacked plot in FIG. 5, indicated the conversion of alumina into LAI composite (as compared against other known forms of LAI). In FIG. 5, from the top, the spectra corresponds to the product prepared according to Example 6. The next two spectra correspond to lithium salt infused activated alumina prepared using activated alumina (Dynamic Adsorbents), and the bottom two spectra correspond to LAI materials deposited on activated alumina using polyaluminum hydroxyl chloride.

Example 8

Approximately 10 g of 100 mesh alumina (Sigma-Aldrich, m.p. 2038° C., batch #03996TJ) was added to 45 g of 10% by weight solution of lithium hydroxide and was heated at about 90° C. for about 24 hours. No reaction took place under these conditions, as the weight of alumina remain unchanged and the lack of reaction confirmed by comparing SEM images of the starting material and the reaction product).

Example 9

Figure 6:
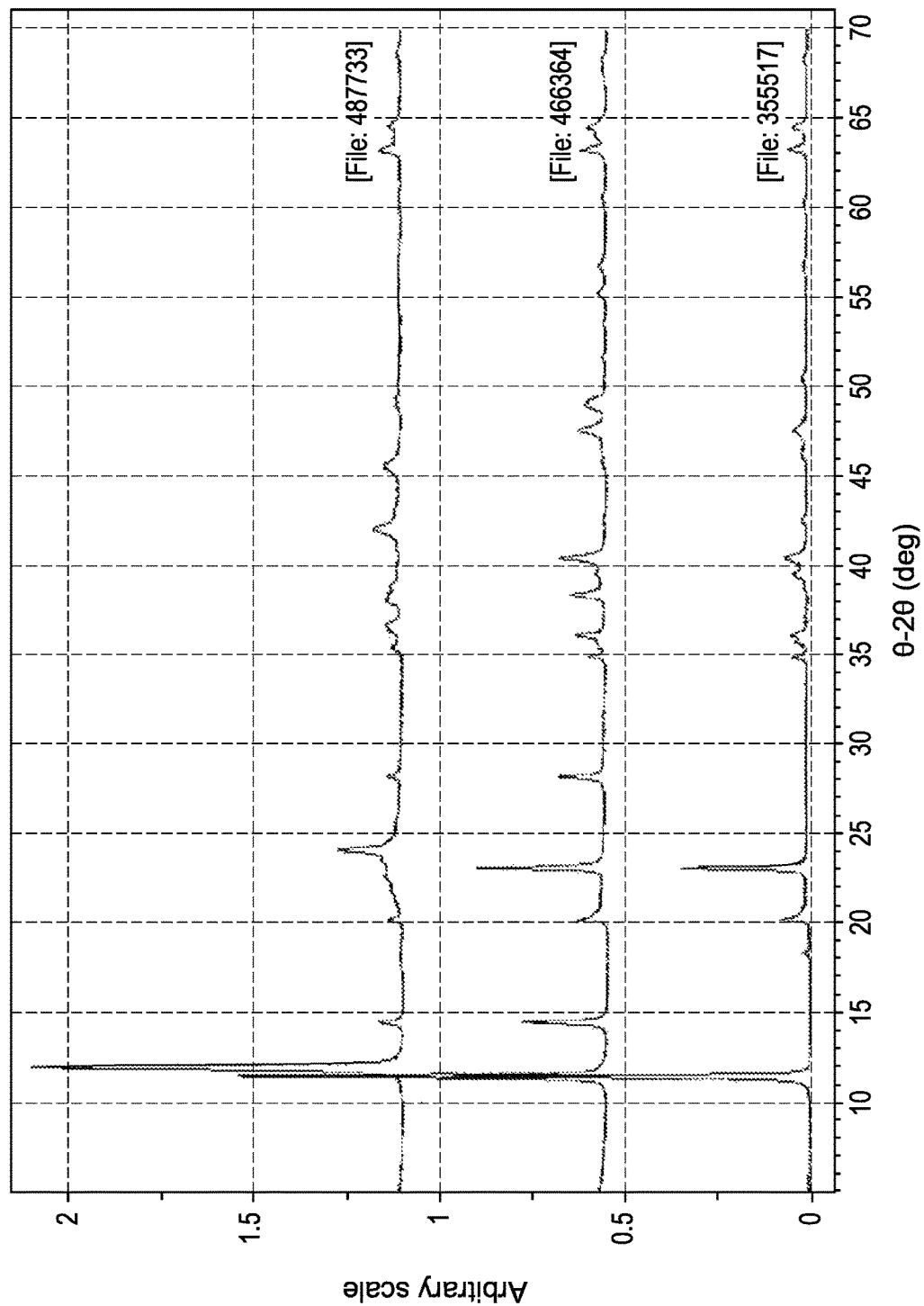
FIG. 6 is a comparison of the X-ray powder diffraction patterns of several embodiments of the present invention.

Approximately 11 g of lithium hydroxide monohydrate and 11 g of anhydrous lithium chloride were dissolved in approximately 225 mL of water at room temperature. To this lithium salt solution, approximately 50 g of activated alumina was added slowly and the reactants were kept in an oven at 95° C. for 6 hours. The yield of the hydroxyl form of LAI was found to be close to 85 g. A portion of this final product, approximately 30 g was neutralized using about 45 g of a 30% lithium chloride solution mixed with 5 g of acetic acid. The final pH of the solution reached a steady state of about 4.2 in about one hour. The resulting solid product was washed with water and dried. The lithium extraction capability of the final product was tested in a column, as provided for the previous examples, having a lithium extraction capacity in the range of between about 4 and 5 g/L. The final product was analyzed and determined to have an impurity content of about 1% of lithium carbonate equivalent. The top most diffraction pattern in FIG. 6 represents the XRPD pattern of materials neutralized using weaker acids, such as is described in Example 9.

Comparative Example 1

A resin based lithium aluminum intercalate material was synthesized as described in U.S. Pat. Nos. 4,159,311; 4,348,296; and 4,430,311, wherein a weak base anion exchanger in the free base form, for example, Dowex Marathon WBA, was contacted with a saturated solution of $AlCl_3$. The mixture, having a pH of approximately 0, was reacted at between about 50° C. and 60° C., and was then titrated with concentrated $NH_4OH$ to raise the pH to near neutrality, at which point $Al(OH)_3$ precipitated in and on the resin beads. Excess $Al(OH)_3$ and $NH_4Cl$ were washed out with water. The resin was then heated at about 75° C. to 80° C. to convert amorphous $Al(OH)_3$ into gibbsite, which served as a seed for subsequent precipitation. The gibbsite-seeded resin was then reacted with sodium aluminate solution at a pH of about 13 and then titrated with 37% HCl to reduce the pH to near neutral, and to grow $Al(OH)_3$ on the gibbsite seed. The mixture was then washed with water to remove excess NaCl and $Al(OH)_3$ and was then heated at about 75° C. to 80° C. to the conversion of all intra-bead $Al(OH)_3$ into gibbsite. The gibbsite-loaded resin was then reacted with LiOH at between about 55° C. to 60° C. to form a 3-layer polytype lithium aluminate $(LiAl_2(OH)_6(OH)$ within the resin at a pH of about 12. The resin was then titrated with approximately 20% HCl to neutrality, to convert the OH form of the lithium aluminate to the chloride form. Excess lithium aluminate and lithium chloride removed by washing with water. The procedure produced a resin having between about 2 and 4 mmol of aluminum and between about 1 and 2 mmol lithium per mL of resin.

The resin based LAI synthesized according to the procedure above was loaded into a column having a diameter of about 2.5 cm, a bed height of about 20 cm, and a bed volume of about 100 $cm^3$. A total of 10 load, wash, and unload cycles were completed, wherein the first 5 cycles were used to optimize flow and volume parameters and the next 5 cycles were run semi-continuously using the optimized parameters. Loading capacity of the resin based LAI using a simulated brine as described herein was about 0.96 g/L.

FIG. 6 shows a comparison of the x-ray powder diffraction (XRPD) pattern for an LAI sorbent prepared according to Example 9 (top spectra), which utilizes a three-dimensional activated alumina wherein the product LAI was neutralized with acetic acid, an LAI sorbent prepared according to Example 3 (middle spectra), which similarly utilizes a three-dimensional activated alumina wherein the product LAI was neutralized with HCl, and an LAI sorbent composition made by a similar method using Gibbsite, a two-dimensional alumina (bottom spectra). As can be seen by the x-ray powder diffraction patterns, the spectra for the LAI product utilizing the three-dimensional activated alumina is different than the LAI product prepared using a two-dimensional Gibbsite alumina base. For example, the x-ray powder diffraction pattern of the three-dimensional activated alumina includes peaks that are not present in the Gibbsite based LAI product indicates that a distinct composition of matter is prepared and plays a role in the improved performance. For example, additional peaks are found in the in the XRPD spectra at approximately 15 deg., 28 deg., and 38 deg., as compared with the XRPD of the Gibbsite based alumina. Additionally, the main peak at approximately 12 deg. is slightly shifted for the Gibbsite based alumina, as compared to the three-dimensional activated alumina based LAI.

Referring still to FIG. 6, minor differences are shown in the XRPD spectra based upon whether acetic acid or HCl is utilized in the neutralization step. For example, the three-dimensional activated alumina based LAI material that is neutralized with HCl includes a peak at about 40.5 deg., while the acetic acid neutralized product does not include a peak at 40.5 deg. These structural/compositional differences appear to be important in the extraction of lithium with higher selectivity (i.e., lower impurities) and high lithium extraction capacities.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A sorbent composition for the recovery of lithium from a lithium containing solution, the sorbent composition comprising:
    a particulate material containing an activated alumina lithium intercalate composition comprising a three-dimensionally structured activated alumina comprising a plurality of pores and a lithium salt present within the plurality of pores,
    wherein the three-dimensionally structured activated alumina includes one or more of $\alpha$-$Al_2O_3$, $\beta$-$Al_2O_3$, $\gamma$-$Al_2O_3$, $\theta$-$Al_2O_3$, $\chi$-$Al_2O_3$, $\kappa$-$Al_2O_3$, $\varepsilon$-$Al_2O_3$, $\delta$-$Al_2O_3$, AlO(OH), pseudoboehmite, or a combination thereof.

2. The composition of claim 1, wherein a mole fraction of lithium to alumina in the activated alumina lithium intercalate composition is in the range from 0.1 to 0.33.

3. The composition of claim 1, wherein the lithium salt comprises lithium chloride or lithium hydroxide.

4. The composition of claim 1, wherein the particulate material has an average diameter from 200 to 800 µm.

5. The composition of claim 1, wherein the three-dimensionally structured activated alumina consists of $Al_2O_3$ or pseudoboehmite.

6. The composition of claim 1, wherein the three-dimensionally structured activated alumina comprises $Al_2O_3$.

7. The composition of claim 1, wherein the three-dimensionally structured activated alumina comprises pseudoboehmite.

8. The composition of claim 1, wherein the three-dimensionally structured activated alumina comprises $Al_2O_3$ and pseudoboehmite.

9. The composition of claim 1, wherein a mole fraction of lithium to alumina in the activated alumina lithium intercalate composition is up to 0.5.

10. A sorbent composition for the recovery of lithium from a lithium containing solution, the sorbent composition comprising:
    a particulate material containing an activated alumina lithium intercalate composition comprising a lithium salt and an activated alumina selected from the group consisting of $\alpha$-$Al_2O_3$, $\beta$-$Al_2O_3$, $\gamma$-$Al_2O_3$, $\theta$-$Al_2O_3$, $\chi$-$Al_2O_3$, $\kappa$-$Al_2O_3$, $\varepsilon$-$Al_2O_3$, $\delta$-$Al_2O_3$, AlO(OH), pseudoboehmite, or a combination thereof.

* * * * *